(12) United States Patent
Gnatenko

(10) Patent No.: US 7,594,591 B2
(45) Date of Patent: Sep. 29, 2009

(54) LID FOR COOKING VESSEL

(76) Inventor: Vitaliy I Gnatenko, 23-b, Yakuba Kolassa Str., Apt. 11, Kyiv (UA) 03146

( * ) Notice: Subject to any disclaimer, the term of this patent is extended or adjusted under 35 U.S.C. 154(b) by 209 days.

(21) Appl. No.: 11/744,068

(22) Filed: May 3, 2007

(65) Prior Publication Data

US 2008/0110884 A1 May 15, 2008

(30) Foreign Application Priority Data

Nov. 10, 2006 (UA) ................................ 2006-11848

(51) Int. Cl.
*A47J 36/12* (2006.01)
*B65D 51/16* (2006.01)
*B65D 43/18* (2006.01)

(52) U.S. Cl. ..................... 220/820; 220/573.1; 220/824; 220/366.1

(58) Field of Classification Search ................. 220/820, 220/824, 831, 573.1, 287, 360, 366.1, 379
See application file for complete search history.

(56) References Cited

U.S. PATENT DOCUMENTS

| | | | | |
|---|---|---|---|---|
| 645,045 A * | 3/1900 | Swift | ......................... | 220/820 |
| 1,617,202 A * | 2/1927 | Dowling | ...................... | 220/291 |
| 1,953,765 A * | 4/1934 | McCluney | ............... | 220/366.1 |
| 2,241,064 A * | 5/1941 | Harbison | ...................... | 220/360 |
| 3,015,405 A * | 1/1962 | Sterling | ......................... | 217/56 |
| 3,337,080 A * | 8/1967 | McIdahl et al. | .............. | 220/520 |
| 4,453,530 A * | 6/1984 | Schlosser | .................... | 126/25 R |
| 4,592,483 A * | 6/1986 | Scouten | ....................... | 220/379 |
| 4,678,011 A * | 7/1987 | Weber | ........................ | 138/96 R |
| 5,730,451 A * | 3/1998 | Walker | ...................... | 280/47.26 |
| 6,726,051 B1 * | 4/2004 | Rennick | ...................... | 220/576 |
| 6,988,630 B2 * | 1/2006 | Matsumoto | ............... | 220/254.4 |
| 2008/0011763 A1 * | 1/2008 | Mauch et al. | ................ | 220/810 |

* cited by examiner

*Primary Examiner*—Anthony D Stashick
*Assistant Examiner*—Niki M Eloshway
(74) *Attorney, Agent, or Firm*—Knobbe Martens Olson & Bear LL

(57) ABSTRACT

A lid for a cooking vessel comprises a body portion having a rim, an underside, and a handle, wherein the rim has a support surface and an outer surface, and is matched to a brim on the cooking vessel brim in size and shape. The lid is configured to be placed in a closed position on the cooking vessel brim and is configured to be placed in a displaced position on a plane of the cooking vessel brim. The lid includes at least one pair of lugs, wherein each lug has an underside configured to be supported by the cooking vessel brim when the lid is in the displaced position. Each lug of the pair has an axis of symmetry forming a central angle with respect to each other of less than about 180°.

4 Claims, 5 Drawing Sheets

LID FOR COOKING VESSEL

CROSS-REFERENCE TO RELATED APPLICATIONS

This application claims priority to Ukraine Patent Application 2006 11848, filed on Nov. 10, 2006.

BACKGROUND

1. Field

The present invention relates to lids for cooking vessels, particularly for pots, pans and other kinds of containers for preparing food.

2. Description of the Related Technology

While processing food in a cooking pot or frying pan covered with a lid, appropriate control of processing intensity is desirable. It is most commonly achieved by providing a ventilation gap between the lid and the upper edge of the vessel to open the space under the lid to the atmosphere. Another problem with the preparation of food is the ease of pouring the liquid from the cooking vessel.

For a conventional cooking vessel as described in U.S. Pat. No. 6,307,193, the intensity of cooking under the cover is adjusted by an upper ventilation cap mounted on an opening in the lid by rotating it with respect to the lower ventilation cap, which is also mounted on the opening and is fixed. Both ventilation caps have equal numbers of ventilation holes, and by rotating the upper ventilation cap the alignment of ventilation holes is controlled, and the amount of steam that escapes from the cooking vessel is regulated. The excessive liquid can be poured off the cooking vessel through a gap formed by displacing the lid on the edge of the vessel. The shortcoming of this cooking vessel is that the lid structure is complicated by additional structural parts that clog the ventilation holes and spaces between the relatively movable caps with food thus making washing the lid difficult. Such lids compel users to give up their customary way of adjusting the intensity of food processing by simply displacing the lid on the vessel edge, which also may be considered a shortcoming. While pouring the liquid off the cooking vessel, the user holds the lid that is unstable on the vessel edge and thus prone to turn over and scald the user.

Another cooking vessel lid (U.S. Pat. No. D. 341,058) comprises a ring portion of an imaginary sphere curved toward the inside of the cooking vessel, and the ring portion may be termed spherical zone. In this case, the intensity of food processing is adjusted by displacing the lid on the vessel edge. A part of the underside surface of the lid in a displaced position is however moved downward and may be brought into contact with the food being cooked. Also, such lid is found in only one displaced position that is stable (fixed) during decanting.

What is desired is a lid for a cooking vessel of any configuration offering adjustment of the ventilation gap over wide limits between the lid rim and the vessel brim for adjusting the intensity of food processing in this vessel with a simultaneous and stable positioning of the lid on the brim as well as for reliably holding the lid while pouring liquids from the cooking vessel.

SUMMARY OF THE INVENTION

According to one embodiment of the invention, a lid for a cooking vessel comprises a body portion having a rim, an underside, and a handle, wherein the rim has a support surface and an outer surface, and is matched to a brim on the cooking vessel brim in size and shape. The lid is configured to be placed in a closed position on the cooking vessel brim and is configured to be placed in a displaced position on a plane of the cooking vessel brim. The lid includes at least one pair of lugs, wherein each lug has an underside configured to be supported by the cooking vessel brim when the lid is in the displaced position. Each lug of the pair has an axis of symmetry forming a central angle with respect to each other of less than about 180°.

According to one embodiment, at least one projection extends downwards from the underside of each lug.

According to one embodiment, the lugs extend from the outside surface of the rim. According to another embodiment, the lugs extend from the underside of the lid body portion. According to another embodiment, one lug of the pair of lugs extends from the outer surface of the rim, while the other lug extends from the underside of the body portion of the lid.

According to one embodiment, the underside of the lugs is flat and lies on a same plane as the support surface of the rim.

BRIEF DESCRIPTION OF THE DRAWINGS

The invention will be described further with reference to the accompanying drawings.

DETAILED DESCRIPTION OF THE PREFERRED EMBODIMENT

A conventional cooking vessel lid having a flat bearing surface on its rim is the simplest to handle both when adjusting the cooking intensity and when decanting. The known lid comprises a body usually of a convex shape and a handle mounted at the apex portion of the body. There is an annular projection on the bearing surface for embedding the lid in the cooking vessel and thus limiting displacement of the lid in the closed position. The intensity of food processing is adjusted and the liquid is poured off the cooking vessel through a gap formed by displacing the lid on the edge of the vessel. The lid rim in this instance is being held so as to bear on the brim of the cooking vessel at two points. In such a position, the lid is unstable and can pivot on the bearing points to either turn deeper into the cooking vessel or slide therefrom and fall to the floor. In both instances, there is a risk of scalding the user, breaking the lid and cooking vessel, causing the lid or the cooking surface to be soiled with dirt, or undesirably disrupt the cooking process.

A further shortcoming of such a lid is its instability in decanting liquids from the cooking vessel. When pouring liquids through the ventilation gap with the vessel held at an angle and the lid displaced, the latter is unstable and must be held in place by the user's fingers. In this position, the lid usually partially goes deeper into the vessel and can slide into the vessel, thus scalding the user, and the contents of the vessel can be lost.

Figure 1:
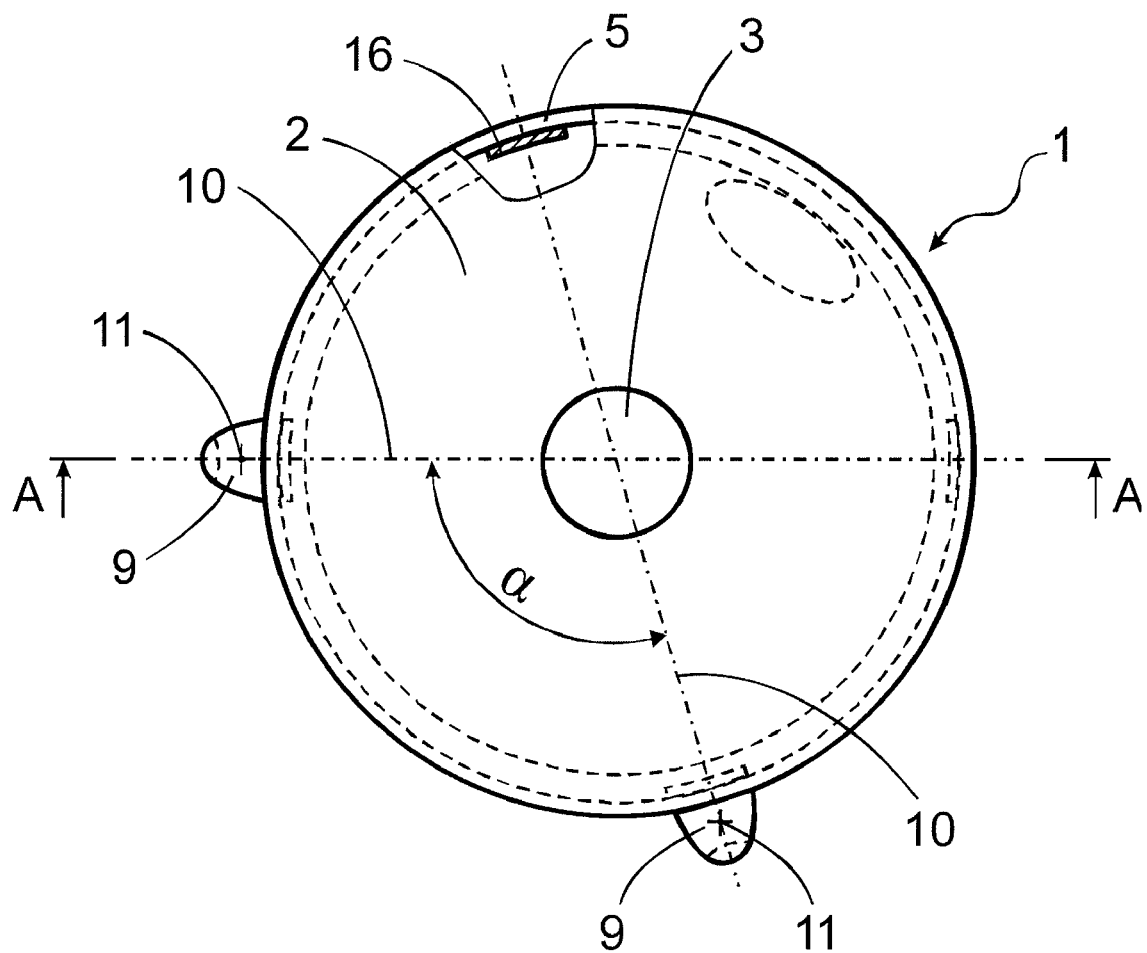
FIG. 1 is a top view of the lid in a closed position on a cooking vessel, according to an embodiment of the invention.
Figure 2:
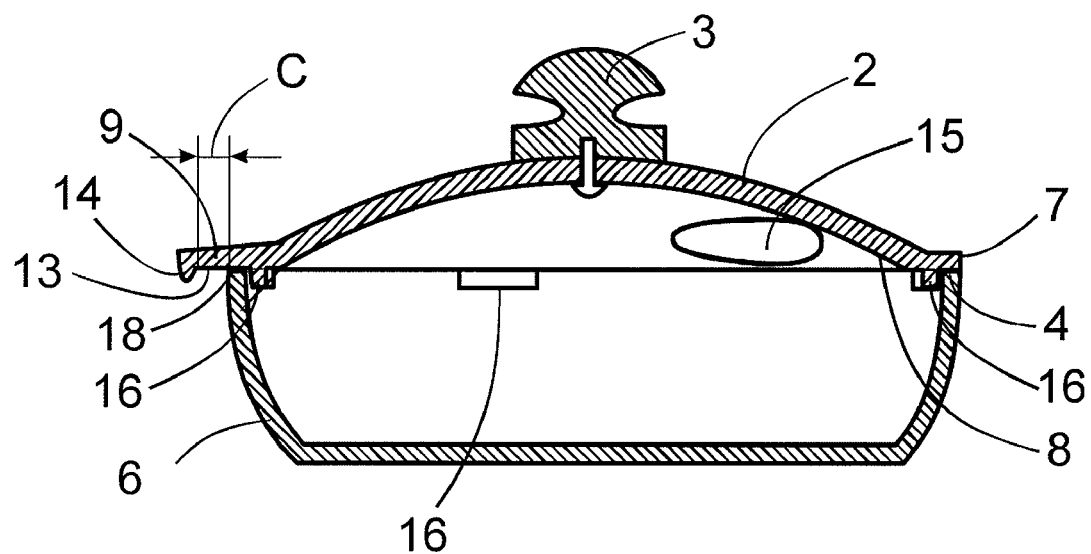
FIG. 2 is a side cross sectional view of the lid in a closed position on a cooking vessel, according to the embodiment of FIG. 1.
Figure 3:
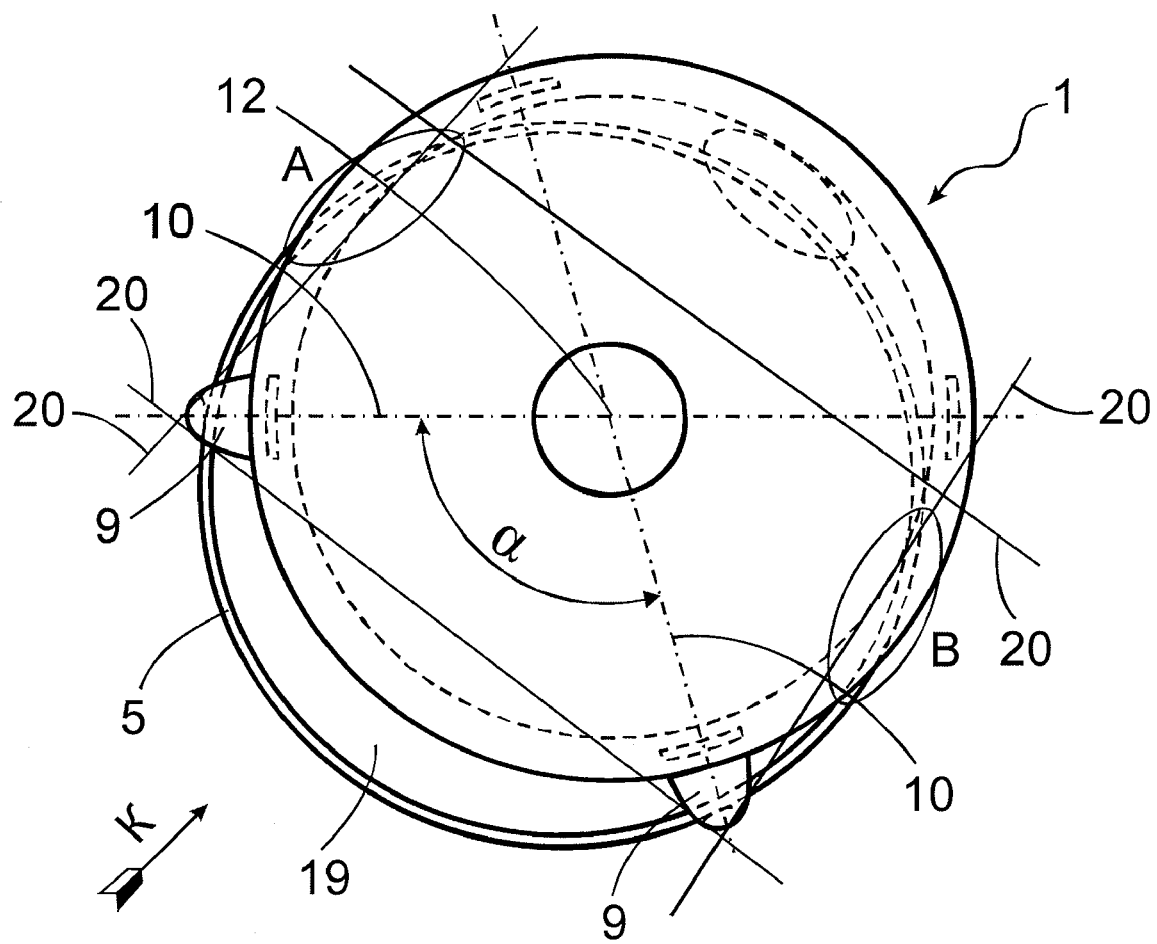
FIG. 3 is a top view of the lid in a position displaced on a cooking vessel, according to the embodiment of FIG. 1.

FIGS. 1, 2, and 3 illustrate one embodiment of this invention. A lid 1 comprises a preferably round body 2 with a handle of a preferably round cross section, or knob 3, arranged in the central part of the body 2. The rim of the lid body has a support surface 4, with which it rests on the top surface 5 of the brim of the cooking vessel 6 (FIG. 2) when in closed position. The lid also has an outside surface 7 and underside surface 8. The rim of the lid is of the proper size and shape for the brim of the cooking vessel.

On the outside surface 7 of the lid rim there is provided at least a pair of lugs 9 hereinafter referred to as outside lugs. The lugs may be of any shape. In the embodiments described, the lugs have the shape of a half of an oval. The lugs, however, may have the shape of geometrical figures, animals, plants, etc. Also, the lugs in a pair can be of different shapes.

The lugs in a pair are arranged on their axes 10 of symmetry (FIG. 1). The term "axis of symmetry" refers herein to an imaginary line that passes through any specified point on the lug (the point herein specified is the center 11 of gravity of each lug) and through the center 12 of the body 2. The term "axis of symmetry" is used herein as a matter of convenience in describing the relative positions of the lugs in a pair. According to an embodiment the central angle a between the axes 10 of symmetry of the pair of outside lugs (or the angle β referring to a pair of inside lugs according to alternative embodiments illustrated in FIGS. 5, 7, 8) is less than about 180°.

The undersides 13 (FIG. 2) of each outside lug 9 are so shaped and disposed that they are simultaneously supported by the top surface 5 (FIG. 1) of the brim when the lid is displaced. If the cooking vessel has a flat brim, i.e., a brim, every point of which is lying in a plane, the undersides 13 (FIG. 2) of the lugs are preferably flat and lying in the same plane as the support surface 4 of the body 2. The underside 13 is provided with a projection 14 to stop any sliding motion of the lid over the brim top surface.

It is preferred that the center of gravity of the lid where the knob 3 is arranged coincide with the center 12 of the body 2, for which a bulge 15 is provided on the underside of the body 2 to bring the lugs 9 in equilibrium with the center 12.

On the support surface 4, there are projections 16, which are arranged so that in the closed position of the lid they are received with a minor clearance into the cooking vessel 6 to limit displacement of the lid on the cooking vessel. The projections 16 are provided beyond the areas of contact of the top surface 5 of the brim and the support surface 4 (FIG. 3) of the body 2 when the lid is being displaced.

It is to be noted that the lid body 2 are not necessarily circular in shape, and equally workable are, for example, ellipses, ovals, etc.

The lid of the invention is used as follows. By gripping the knob 3, the lid 1 is raised from the top surface of the brim of the cooking vessel 6 until the projections 16 are found above the top surface of the brim. Next, the lid 1 (FIG. 3) is displaced in the direction opposite to that where there are the outside lugs 9 (in the direction of arrow K) and lowered onto the top surface of the brim. In this case, the undersides 13 of the lugs 9 (FIG. 2) simultaneously rest on the top surface of the brim of the cooking vessel 6 and prevent the lid portions where the lugs are disposed from being lowered into the cooking vessel. The rim of the lid can be wide apart from the brim when the projections 14 abut against the outside surface 18 of the brim of the cooking vessel 6. Being lowered onto the top surface of the brim, the lid 1 rests with the undersides 13 of the lugs and the support surface 4 of the lid in two bearing areas A and B (FIG. 3) where the rim of the body 2 meets with the top surface of the brim.

When the lid is in a displaced position there is formed a gap 19 between the rim and the brim, which gap is a ventilation opening to adjust the intensity of the cooking process. The adjustment is effected by way of changing the width of the gap 19 moving the lid within the spacing C (FIG. 2) between the projection 14 and the outside surface 18 of the cooking vessel 6.

The gap 19 can be readily formed elsewhere by turning the lid in a displaced position about the center 12 with the help of the knob 3 to also adjust the intensity of the cooking process.

The lid is held stable in a displaced position due to the lid center of gravity being coincidental with the center 12 as a geometrical concept (FIG. 3) of the body 2 and within the area defined by lines 20, which connect the extreme bearing points of the lugs 9 and the bearing areas A and B.

To pour liquids from the cooking vessel, the lid is displaced as described above until a desired gap is formed. Then, by pressing the lid 1 with a user's fingers to the brim of the vessel and raising the vessel while holding its handles (not shown), the user pours liquid out through the gap 19 thus formed. In this case, the lugs 9 prevent the lid 1 from being lowered into the cooking vessel, while additional friction produced between the lugs 9 and the brim of the cooking vessel prevents sliding of the lid from the vessel.

Figure 4:
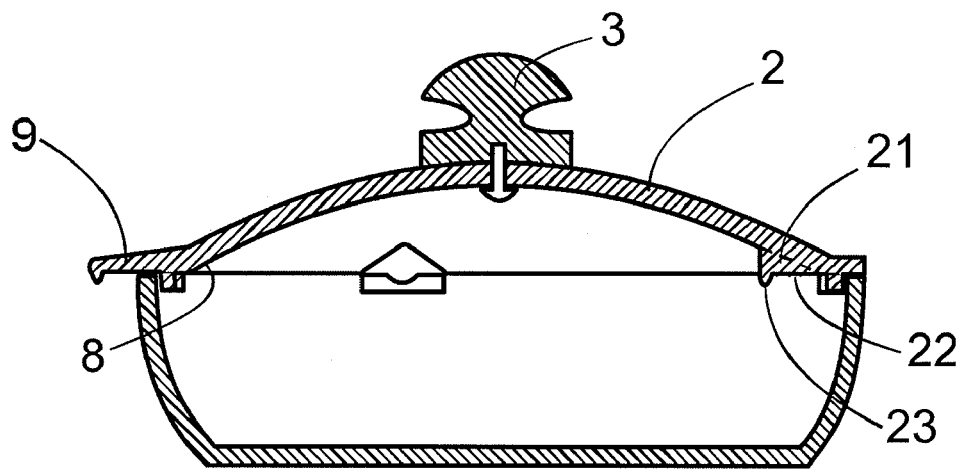
FIG. 4 is a side cross sectional view of the lid in a closed position on a cooking vessel, according to another embodiment of the invention.
Figure 5:
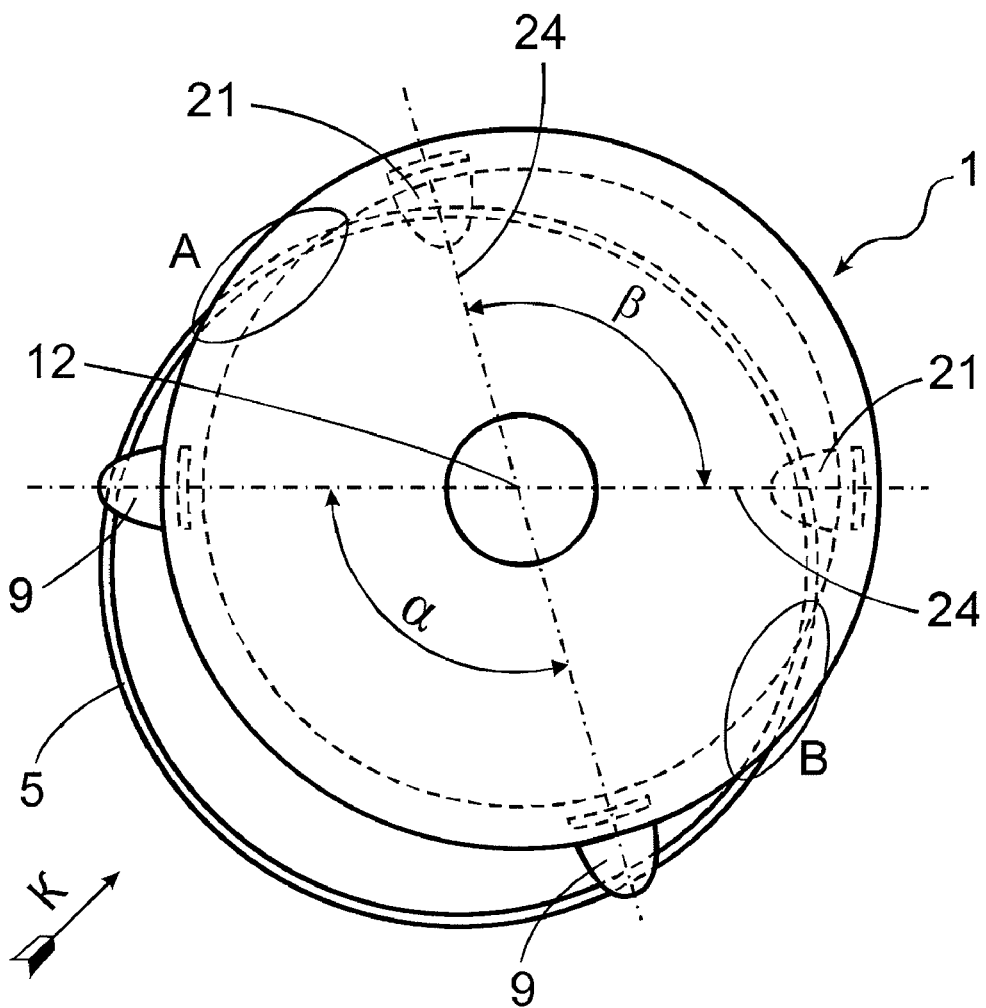
FIG. 5 is a top view of the lid in a position displaced on a cooking vessel, according to the embodiment of FIG. 4.

FIGS. 4 and 5 illustrate another embodiment of the invention where the ventilation gap can be further increased and the displaced position of the lid made more stable.

This embodiment differs from the first one such that in addition to the pair of outside lugs 9 (FIG. 4), a pair of lugs 21 extends from the underside 8 of the rim of the body 2 (hereinafter inside lugs). Each of these inside lugs has an underside 22, which is similar to the underside 13 of the outside lugs 9. Where the cooking vessel has a flat top surface of its brim, it is preferably flat and lying on the plane of the support surface 4 of the lid rim. The underside 22 is provided with a projection 23 extending downward to stop any sliding motion of the lid over the brim top surface. The inside lugs 21 are arranged on their axes 24 of symmetry (FIG. 5) forming the angle β, which is less than about 180°.

A pair of outside lugs 9 and a pair of inside lugs 21 are so arranged that their axes of symmetry coincide (i.e., α=β), so the pairs are disposed on the arms of vertically opposite angles with their vertex at the center 12.

The coincidence of the center of gravity and the center 12 of the body 2 is ensured by a proper selection of masses of outside lugs 9 and inside lugs 21, therefore there is no need for the bulge designated 15 in FIG. 2.

The lid according to this embodiment of the invention is to be used in the same manner as described in connection with the first embodiment, with the difference that whenever the lid is displaced in the direction of arrow K, it rests on the top surface 5 (FIG. 5) with its undersides 22 (FIG. 4) of the inside lugs 21. The lid according to this embodiment is more stable on the brim because the bearing area defined by the imaginary polygon having sides represented by the lines connecting the areas where the lid rests on the brim is larger (four areas where the lugs rest on the brim and two areas A and B where the lid rim rests on the brim).

Figure 6:
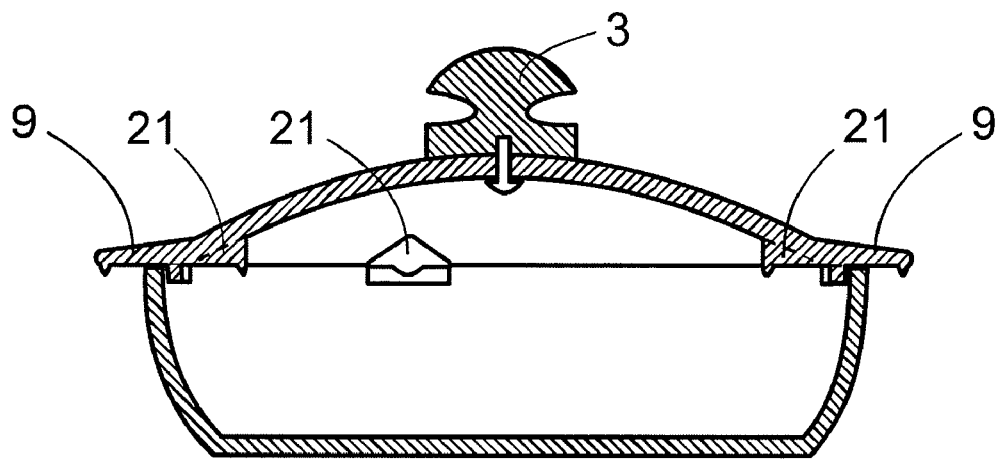
FIG. 6 is a side cross sectional view of the lid in position closed on a cooking vessel, according to another embodiment of the invention.
Figure 7:
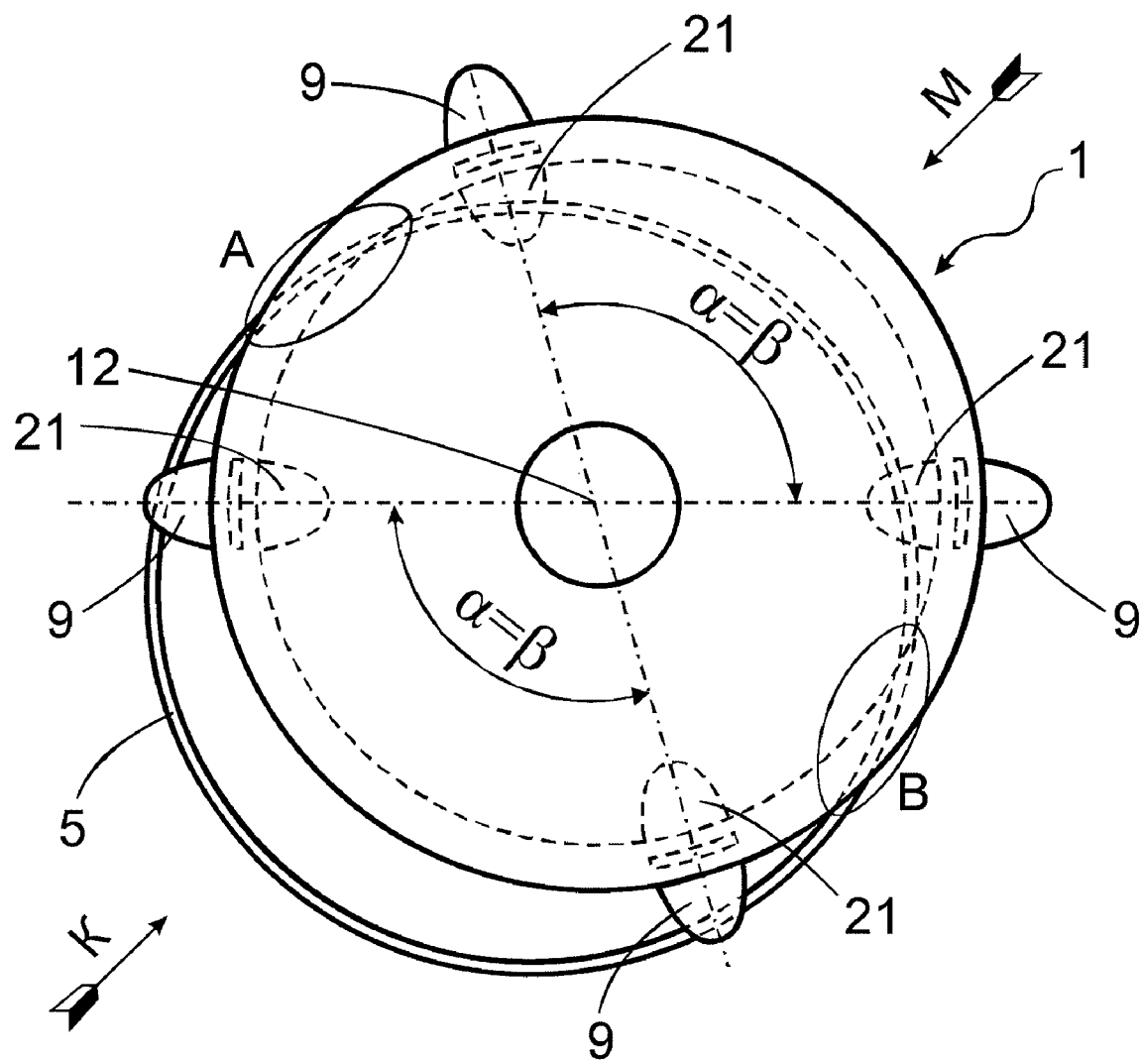
FIG. 7 is a top view of the lid in position displaced on a cooking vessel, according to the embodiment of FIG. 6.

FIGS. 6 and 7 illustrate another embodiment of the invention in which the ventilation gap can be provided at two opposite sides relative the lid, and to that end the lid body is provided with two pairs of outside lugs 9 (FIG. 7) on the axes of symmetry making angles α (these pairs are disposed on the arms of vertically opposite angles with their vertex at the center 12) and two pairs of inside lugs 21 on the axes of symmetry making angles β. All these pairs of lugs are so arranged that their axes of symmetry coincide (i.e., α=β) so that there are four binary lugs.

The lid according to this embodiment of the invention is to be used in the same manner as described in connection with the above embodiment, with the difference that the lid can take two displaced positions. Where it is moved in the direction of arrow K, it will rest on the top surface 5 with its outside lugs 9 and inside lugs 21, or where the lid 1 is moved in the opposite direction represented by the arrow M, it will rest on the top surface 5 with its other outside lugs 9 and inside lugs 21. The lid according to this embodiment is as stable as that described in connection with the above embodiment of the invention.

Figure 8:
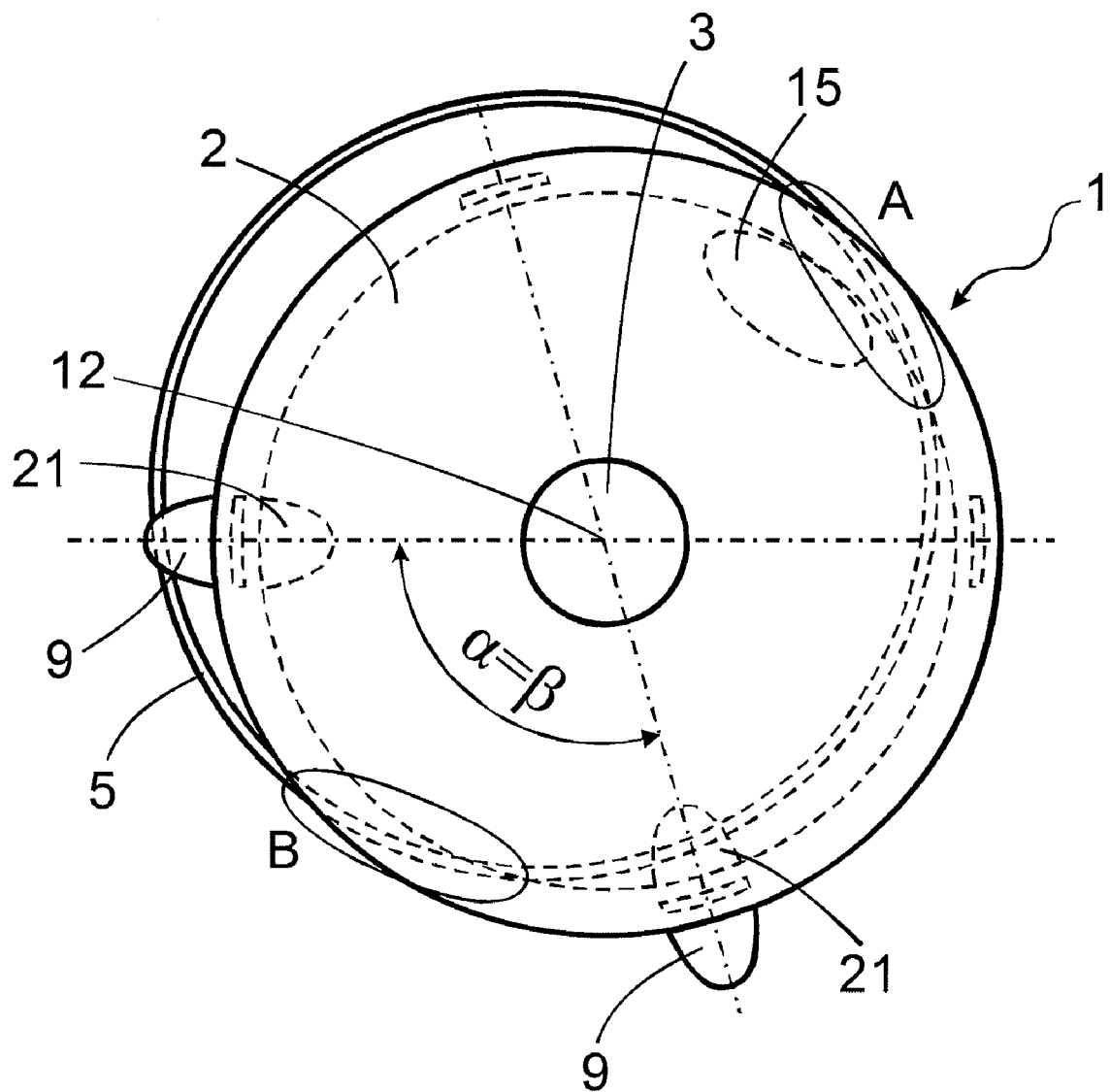
FIG. 8 is a top view of the lid in a position displaced on a cooking vessel, according to another embodiment of the invention.

FIG. 8 illustrates the fourth embodiment of the invention. This embodiment of the invention, as distinguished from the one shown in FIGS. 6 and 7, comprises a lid provided with one pair of outside lugs 9 on the axes of symmetry making the angle α and one pair of inside lugs 21 on the axes of symmetry making the angle β. All these pairs of lugs are so arranged that their axes of symmetry coincide (i.e., α=β). Both pairs of the lugs are disposed on the arms of vertically opposite angles with their vertex at the center 12 (i.e., there are provided two binary lugs).

For this embodiment of the invention, as with the first embodiment, the knob 3 is preferably arranged at the center of gravity of the lid wherein the center of gravity and the center 12 of the body 2 coincide, for which purpose the bulge 15 is provided on the underside of the body 2 to bring the lugs in equilibrium.

The lid according to this embodiment of the invention is to be used in the same manner as described in connection with the first embodiment, i.e., by placing both outside lugs on the brim. However, the lid can be used in another way as shown in FIG. 8 which includes forming a ventilation gap by raising the lid body 2 above the cooking vessel and placing it thereon so that one outside lug 9 and one inside lug 21 rest on the top surface 5 of the brim. As a result, the lid is supported on the brim in four areas, namely, areas A and B where the brim and the lid meet and on the portions of the brim where it meets with the outside lugs 9 and inside lugs 21. In this instance, the lid shows good stability in its displaced position. Compared with the first embodiment of the invention, the present structure is capable of forming a ventilation gap on the opposite side by placing the other inside and outside lugs of the same pairs on the brim without turning the lid around the center 12 of the body 2.

The lid just described according to embodiments of the invention can have any shape and can be used with the cooking vessels of the same shape and makes possible forming wide ranges of ventilation gaps between the brim of the vessel and the rim of the lid to thereby adjust the intensity of the cooking process and at the same time provides for the stability of the lid on the vessel at all times including pouring the liquids from the vessel.

Embodiments of the invention may be variously otherwise embodied within the scope of the appended claims.

What is claimed is:

1. A lid for a cooking vessel comprising:
   a body portion having a rim, an underside, and a handle, wherein the rim includes a support surface and an outer surface, and is matched to a brim on the cooking vessel in size and shape, and wherein the lid is configured to be placed in a closed position on the cooking vessel brim and in a displaced position on a plane of the cooking vessel brim;
   at least one pair of lugs on the rim, wherein each lug has an underside configured to be supported by the cooking vessel brim when the lid is in the displaced position, and wherein each lug of the pair has an axis of symmetry forming a central angle with respect to each other of less than about 180°; and
   at least one projection extending downwards from the underside of each lug to limit displacement of the lid on the cooking vessel brim.

2. A lid for a cooking vessel comprising:
   a body portion having a rim, an underside, and a handle, wherein the rim includes a support surface and an outer surface, and is matched to a brim on the cooking vessel in size and shape, and wherein the lid is configured to be placed in a closed position on the cooking vessel brim and in a displaced position on a plane of the cooking vessel brim; and
   at least one pair of lugs on the rim, wherein each lug has an underside configured to be supported by the cooking vessel brim when the lid is in the displaced position, and wherein each lug of the pair has an axis of symmetry forming a central angle with respect to each other of less than about 180°;
   wherein the lugs extend from the outside surface of the rim.

3. A lid for a cooking vessel comprising:
   a body portion having a rim, an underside, and a handle, wherein the rim includes a support surface and an outer surface, and is matched to a brim on the cooking vessel in size and shape, and wherein the lid is configured to be placed in a closed position on the cooking vessel brim and in a displaced position on a plane of the cooking vessel brim; and
   at least one pair of lugs on the rim, wherein each lug has an underside configured to be supported by the cooking vessel brim when the lid is in the displaced position, and wherein each lug of the pair has an axis of symmetry forming a central angle with respect to each other of less than about 180°;
   wherein one lug of the pair of lugs extends from the outer surface of the rim, and the other lug extends from the underside of the body portion of the lid.

4. A lid for a cooking vessel comprising:
   a body portion having a rim, an underside, and a handle, wherein the rim includes a support surface and an outer surface, and is matched to a brim on the cooking vessel in size and shape, and wherein the lid is configured to be placed in a closed position on the cooking vessel brim and in a displaced position on a plane of the cooking vessel brim; and
   at least one pair of lugs on the rim, wherein each lug has an underside configured to be supported by the cooking vessel brim when the lid is in the displaced position, and wherein each lug of the pair has an axis of symmetry forming a central angle with respect to each other of less than about 180°;
   wherein the underside of the lugs is flat and lies on a same plane as the support surface of the rim.

* * * * *